(12) United States Patent
Kreuzer et al.

(10) Patent No.: US 9,060,303 B2
(45) Date of Patent: Jun. 16, 2015

(54) MULTI-RAT MEASUREMENT REPORTING

(75) Inventors: Werner Kreuzer, Baiern (DE); David Philip Hole, Southampton (GB)

(73) Assignee: Blackberry Limited, Waterloo, ON (CA)

(*) Notice: Subject to any disclaimer, the term of this patent is extended or adjusted under 35 U.S.C. 154(b) by 0 days.

(21) Appl. No.: 13/301,410

(22) Filed: Nov. 21, 2011

(65) Prior Publication Data
US 2012/0302227 A1    Nov. 29, 2012

Related U.S. Application Data

(63) Continuation of application No. PCT/EP2010/067867, filed on Nov. 19, 2010.

(51) Int. Cl.
*H04W 4/00* (2009.01)
*H04W 24/10* (2009.01)
*H04W 88/06* (2009.01)

(52) U.S. Cl.
CPC .............. *H04W 24/10* (2013.01); *H04W 88/06* (2013.01)

(58) Field of Classification Search
CPC .................................................... H04W 88/02
USPC ........ 455/422.1, 552.1, 436, 424, 513, 452.2; 370/332
See application file for complete search history.

(56) References Cited

U.S. PATENT DOCUMENTS

2007/0232341 A1* 10/2007 Sakata .......................... 455/509
2012/0295606 A1* 11/2012 Sebire et al. ............... 455/422.1

FOREIGN PATENT DOCUMENTS

WO    2011092636    8/2011

OTHER PUBLICATIONS

U.S. Appl. No. 61/298,450, filed Jan. 2012, Sebire et al.*
TIA/EIA Interim Standard, "Upper Layer (Layer 3) Signaling Standard for cdma2000 Standards for Spread Spectrum Systems," Mar. 2000 (1536 pages).
"3rd Generation Partnership Project; Technical Specification Group GSM/EDGE Radio Access Network; Radio subsystem link control (Release 9)," 3GPP TS 45.008, Version 9.4.0, Sep. 2010 (146 pages).

(Continued)

*Primary Examiner* — Chuck Huynh
(74) *Attorney, Agent, or Firm* — Fish & Richardson P.C.

(57) ABSTRACT

An example method for preparing a measurement report on neighbor resources of a multi-RAT mobile station is disclosed. In the example method, the mobile station (MS) supports a plurality of radio access technologies (RATs). The example method comprises receiving a plurality of RAT resource reporting values, each RAT resource reporting value indicating a number of resources of the corresponding RAT to be included into the measurement report, determining a plurality of lists of valid neighbor resources associated with the plurality of RATs, and including resources from the plurality of lists of valid neighbor resources into the measurement report according to a RAT sequence of the plurality of RATs, wherein a second resource of the given RAT is included into the report, subject to including a first resource into the measurement report, for each of the plurality of RATs for which the RAT resource reporting value is greater than zero.

22 Claims, 3 Drawing Sheets

(56) References Cited

OTHER PUBLICATIONS

"3rd Generation Partnership Project; Technical Specification Group Radio Access Network; Evolved Universal Terrestrial Radio Access (E-UTRA); Requirements for support of radio resource management (Release 9)," 3GPP TS 36.133, Version 9.5.0, Oct. 2010 (389 pages).
"3rd Generation Partnership Project; Technical Specification Group Radio Access Network; Requirements for support of radio resource management (FDD) (Release 9)," 3GPP TS 25.133, Version 9.5.0, Sep. 2010 (250 pages).
"3rd Generation Partnership Project; Technical Specification Group Radio Access Network; Requirements for support of radio resource management (TDD) (Release 9)," 3GPP TS 25.123, Version 9.3.0, Sep. 2010 (447 pages).
Huawei Technologies Co. Ltd. et al., "Measurement reporting of multi-RAT MS," GP-100372, 3GPP TSG-GERAN #45, Berlin, Germany, Mar. 2, 2010 (2 pages).
LG Electronics Inc. et al., "The usage of XXX_REPORTING_OFFSET," GP-100161, 3GPP TSG-GERAN #45, Berlin, Germany, Feb. 24, 2010 (3 pages).
Nokia Siemens Networks et al., "Change Request: Corrections to measurement reporting of inter-RAT cells" GP-101826, 3GPP TSG-GERAN Meeting #48, San Jose del Cabo, Mexico, Nov. 17, 2010 (6 pages).
Patent Cooperation Treaty, "International Search Report and Written Opinion," issued in connection with PCT Patent Application No. PCT/EP2010/067867, dated Sep. 5, 2011 (13 pages).
International Bureau, "International Preliminary Report on Patentability," issued in connection with PCT Patent Application No. PCT/EP2010/067867, dated May 30, 2013, (11 pages).
Japanese Patent Office, "Official Action", issued in connection with corresponding Japanese Patent Application No. 2013-539142, dated Mar. 26, 2014 (4 pages).
Global System for Mobile Communications, "3rd Generation Partnership Project; Technical Specification Group GSM/EDGE Radio Access Network; Radio subsystem link control (Release 9)", V9.4.0, pp. 57-60 (Sep. 2010); (5 pages).
Mexican Institute of Industrial Property, "Office Action", issued in connection with corresponding Mexican Patent Application No. MX/a/2013/005137, dated Mar. 21, 2014. (4 pages—including English translation).
Mexican Patent Office, "Office Action", issued in connection with Mexican Patent Application No. MX/E/2014/049942, dated Aug. 26, 2014 (3 pages).
Korean Intellectual Property Office, "Office Action", issued in connection with Korean Patent Application No. 10-2013-7015590, dated Aug. 26, 2014 (4 pages).
IP Australia, "Examination Report", issued in connection with Australian Patent Application No. 20100364236, dated Sep. 9, 2014 (3 pages).
Japanese Patent Office, Notice of Final Rejection, issued in connection with Japanese Patent Application No. 2013-539142, mailed Nov. 21, 2014 (6 pages).
Office Action issued in KR Application No. 519981071697 on Mar. 3, 2015.
Huawei Technologies Co. Ltd, "Measurement reporting of multi-RAT MS", 3GPP TSG GERAN2 #40bis, G2-090003, 2009.
Office Action issued in CA Application No. 2,817,271 on Feb. 24, 2015.
Office Action issued in Mexican Application No. MX/a/2013/005137 on Feb. 5, 2015; 8 pages.

\* cited by examiner

MULTI-RAT MEASUREMENT REPORTING

RELATED APPLICATION(S)

This patent arises from a continuation of International Application Serial No. PCT/EP2010/067867, entitled "Multi-RAT Measurement Reporting" and filed on Nov. 19, 2010, which is hereby incorporated by reference in its entirety.

FIELD OF THE DISCLOSURE

The present document relates to digital cellular telecommunications systems, such as GSM (Global System for Mobile communication) networks. In particular, the present document relates to the radio sub-system link control implemented in the Mobile Station (MS), Base Station System (BSS) and/or Mobile Switching Centre (MSC) of such digital cellular telecommunications systems.

BACKGROUND

Digital cellular telecommunication systems such as GSM comprise a plurality of base station subsystems (BSS), wherein a base station subsystem (BSS) typically comprises a Base station controller (BSC) and one or more Base Transceiver Stations (BTS). Each BTS provides coverage to one or more mobile stations (MS) within a certain geographic area (referred to as a cell). In order to maintain a call in progress as a MS, which is engaged in a point-to-point call or which is engaged with access to the uplink of a channel used for a voice group call, passes from one cell coverage area to another, handover of the MS from one BTS to a next BTS may be employed. Furthermore, handover may be employed to meet network management requirements, e.g. with regards to the relief of congestion in certain cells.

The handover may occur from one or more traffic channels (TCH) on one cell to one or more channels on a neighbouring cell. Alternatively, handover may occur between channels on the same cell which are carried on different frequencies. For a multiband MS, the handover may be allowed between channels on different cells which are carried on different frequency bands, e.g. between a GSM 900 traffic channel (TCH) and a DCS 1 800 TCH. For a multi-RAT (Radio Access Technology) MS, i.e. an MS supporting multiple radio access technologies such as GSM, UTRAN (UMTS Terrestrial Radio Access Network) FDD (Frequency Division Duplexing), UTRAN TDD (Time Division Duplexing), E-UTRAN (evolved UTRAN), CDMA (Code Division Multiple Access) 2000, handover may be allowed between GSM and the other radio access technologies.

The overall handover process may be implemented in the MS, BSS and MSC. Measurements of the radio subsystem downlink performance and signal levels received from neighbouring cells may be made within the MS. These measurements may be signalled to the BSS for assessment. The BSS may measure the uplink performance for the MS being served and may assess the signal level of interference on its idle traffic channels. Initial assessment of the measurements in conjunction with defined thresholds and a predefined handover strategy may be performed in the BSS. Assessment requiring measurement results from other BSS or other information resident in the network (e.g. the MSCs), may be performed in the MSC or network management components.

As such, a MS typically provides regular measurement reports to the network, e.g. via its serving BTS. These measurement reports provide information on the neighbouring cells and/or the frequencies served within the neighbouring cells. In particular, these measurement reports provide information on the downlink performance and signal levels of cells within the vicinity of the MS. A multi-RAT MS should be able to provide measurement reports comprising sufficient information on the neighbouring cells and/or the frequencies served within the neighbouring cells regarding all or some of the radio access technologies supported by the MS. At the same time, the data size of the measurement reports should be kept at a pre-determined level, i.e. the required signalling overhead for the measurement reports should be kept at or below a pre-determined level. The present document addresses this technical problem, i.e. the problem of providing measurement reports about the neighbouring cells of some or all of the supported radio access technologies to the digital cellular telecommunications system at a pre-determined limited signaling overhead.

Details regarding the handover process and the measurement reports provided by a MS are given in the document 3GPP TS 45.008 V9.4.0 Radio subsystem link control which is incorporated by reference. Particular reference is made to Section 8.4.7 of the above mentioned document, regarding additional cell reporting requirements for multi-RAT MS.

SUMMARY

According to an aspect, a method for preparing a measurement report on network resources in the vicinity of a multi-RAT mobile station (MS) is described. The MS may be operated in a cellular telecommunications network. The MS may support a plurality of radio access technologies (RATs), e.g. any combination of UTRAN-TDD, UTRAN-FDD, E-UTRAN, and/or CDMA2000. It should be noted that in the following, a reference to RATs may also comprise reference to RAT modes. The digital cellular telecommunications network may be a GSM network and the MS may furthermore support GSM. By way of example, the MS may support GSM and one, two, three, four, five or six other RATs or RAT modes. In particular, the MS may support at least two or at least three RATs of which network resources are to be included into the report. Typically, the method is performed on the MS and the measurement report is provided to the cellular telecommunications network, e.g. via a BSS of the network.

The method may comprise the act of providing a plurality of RAT resource reporting values, each RAT resource reporting value indicating a number of resources of the corresponding RAT that should be included into the measurement report. As such, the RAT resource reporting values indicate target values for the number of resources which should be reported for the corresponding RAT. The RAT resource reporting values may be available at the MS. Alternatively or in addition, the RAT resource reporting values may be received at the MS e.g. from the digital cellular telecommunications network. In an embodiment, the network broadcasts the RAT resource reporting values to a plurality of mobile stations connected to the network. The RAT resource reporting values may be 3GPP XXX_MULTIRAT_REPORTING parameters, wherein the XXX indicates the corresponding RAT. In an embodiment, the RAT resource reporting value of a given RAT is greater than 1 or greater than 2.

The method may comprise the act of determining a plurality of lists of valid neighbour resources associated with the plurality of RATs. Neighbour resources may be specified as network cells, as used e.g. in GSM, UTRAN TDD and UTRAN FDD. Alternatively or in addition, neighbour resources may be specified as frequencies, as used e.g. in E-UTRAN. Neighbour cells are cells within the vicinity of the MS. Neighbour frequencies are frequencies provided by the network in the vicinity of the MS. For each of the RATs supported by the MS a corresponding list of valid neighbour resources may be determined.

Prior to determining the plurality of lists of valid neighbour resources, the method may comprise the act of determining at least one measurement quantity for each of the resources of a plurality of lists of neighbour resources. The plurality of lists of neighbour resources may be associated with the plurality of RATs supported by the MS, i.e. each list of neighbour resources may be associated with a particular RAT. In other words, the resources of a list of neighbour resources may be associated with the same RAT. As such, the list of neighbour resources may be lists of neighbor cells and/or neighbor frequencies, depending on the particular RAT. The list of neighbour resources may be received at the MS e.g. from the digital cellular telecommunications network. That is, the network may inform a MS about the resources of the different RATs which are in the vicinity of the MS. Alternatively or in addition, the MS may be configured to perform "blind" detection of neighbour resources which have not been provided by the network. The detected neighbour resources may be added to the respective list of neighbour resources.

The at least one measurement quantity may be indicative of a quality of a connection between the MS and the respective resource. In particular, the at least one measurement quantity of a given resource may be indicative of a signal-to-noise ratio and/or a signal strength, which is achieved when operating the MS in the given resource. A type of the at least one measurement quantity of a given resource may be dependent on the RAT associated with the given resource. In other words, different types of measurement quantities may be defined for the different RATs. By way of example, a different type of measurement quantity may be defined for E-UTRAN than for UTRAN TDD. Further details on the different types of measurement quantities for the different RATs in the context of 3GPP will be described at a later stage in this document.

Using the determined one or more measurement quantities of the resources of the plurality of neighbour resources, the plurality of lists of valid neighbour resources may be determined from the corresponding lists of neighbour resources. In particular, each list of the plurality of lists of valid neighbour resources may be a subset of the corresponding list of the plurality of lists of neighbour resources. In an embodiment, each resource in the plurality of lists of valid neighbour resources meets the criteria that the determined at least one measurement quantity for the resource exceeds at least one threshold value. In a similar manner to the types of measurement quantities, the at least one threshold value may be dependent on the RAT, i.e. the threshold values may be different for the different RATs.

The method may comprise the act of determining a RAT sequence of the plurality of RATs. The RAT sequence may be determined by ranking the plurality of RATs in accordance to the respective plurality of RAT resource reporting values. By way of example, the RATs may be ranked in descending order of their corresponding RAT resource reporting values. As such, the RAT sequence may start with the RAT having the highest RAT resource reporting value and end with a RAT having the lowest RAT resource reporting value among the plurality of RATs supported by the MS.

The method may comprise the act of including resources from the plurality of lists of valid neighbour resources into the measurement report according to the RAT sequence. It should be noted that the act of including a resource may comprise the act of including information about the resource (e.g. information associated with the at least one measurement quantity of the resource) into the report. The including may be performed in accordance to the RAT sequence, meaning that the including of resources is started with the list of valid neighbour resources associated with the first RAT in the RAT sequence, and subsequently continued with a next list of valid neighbour resources associated with a next RAT in the RAT sequence, and so on. In an embodiment, only one resource from a list of valid neighbour resources of a given RAT is included into the report, and subsequently one resource of the next list is included, wherein the next list is associated with the next RAT in the RAT sequence, and so on.

The act of including may be performed such that a second resource of the given RAT is included into the report, subject to including a first resource into the measurement report, for each of the plurality of RATs for which the RAT resource reporting value is greater than zero. In other words, during a first iteration one valid resource of each RAT having a RAT resource reporting value greater zero may be included into the report. This including may be performed in accordance to the RAT sequence. In a second iteration, further resources may be included into the report for RATs having a RAT resource reporting value greater one, and so on.

The act of including a resource may comprise the act of including one resource of the list of valid neighbour resources into the report for a particular RAT from the plurality of RATs, if the particular RAT has a RAT resource reporting value which is greater than the number of resources of the particular RAT that have already been included into the report. As such, resources associated with the particular RAT may be included into the report in an iterative procedure until a number corresponding to the RAT resource reporting value has been included into the report.

The act of including may comprise the act of selecting a current RAT from the plurality of RATs in accordance to the RAT sequence. If the number of resources of the current RAT which have already been included into the report is lower than the respective RAT resource reporting value, one resource from the plurality of valid resources associated with the current RAT may be included into the report.

The act of including may comprise, subject to an iteration during which one resource has been included for each RAT of the plurality of RATs for which the number of resources that had previously been included into the report is lower than the respective RAT resource reporting value, performing a further iteration. The further iterations may be performed until for each RAT of the plurality of RATs, the number of resources that have been included into the report corresponds to the RAT resource reporting value or until the list of valid neighbour resources does not comprise any non reported resources.

The method may comprise the act of ranking the resources within the plurality of lists of valid neighbour resources in accordance to the at least one measurement quantity determined for the resources. As such, the resources which are included into the report may correspond to the highest ranking resources of their respective lists of valid neighbour resources. In other words, during each iteration the remaining highest ranking resource for a RAT may be included into the report.

The method may comprise the act of providing a maximum RAT resource reporting value indicating the total number of resources to be included into the measurement report. The maximum RAT resource reporting value may be greater than one (e.g. two, three, four, five, six, seven, eight, nine, ten) or greater than two, three, four, or five. Subject to including a resource into the measurement report, the method may determine a total number of resources included into the report. The act of including resources into the report may be terminated, e.g. the report may be completed, if the total number of resources corresponds to the maximum RAT resource reporting value or if the total number of resources corresponds to the sum of the plurality of RAT resource reporting values. It may occur that the number of valid resources of a particular RAT is lower than the corresponding maximum RAT resource reporting value. As such, a further "or" alternative and condition for terminating the act of including may be if for each RAT, the number of resources included into the report corresponds to the lower one of the corresponding RAT resource reporting value and the number of resources in the corresponding list of valid neighbour resources.

As indicated above, the network may be a GSM network. In such a case, the method may comprise the act of including a valid GSM cell (as a valid resource) into the measurement report, subject to determining that for each RAT, the number of resources included into the report corresponds to the lower one of the corresponding RAT resource reporting value and the number of resources in the corresponding list of valid neighbour resources. If the total number of resources included into the report is lower than the maximum RAT resource reporting value, valid GSM cells may be included into the report. In a similar manner to the other RAT resources, valid GSM cells may be determined using GSM specific measurement quantities and GSM specific thresholds.

The method may comprise the act of providing a GSM cell parameter indicative of a number of valid GSM cells to be included into the report. The GSM cell parameter may indicate a minimum number of GSM cells to be reported. Alternatively, the GSM cell parameter may indicate a maximum number of non GSM cells to be reported. When a GSM cell parameter is available at the MS, the including of RAT resources may be terminated if the total number of resources corresponds to the maximum RAT resource reporting value reduced in accordance to the GSM resource parameter or if the other conditions outlined above are met.

The method may further comprise the act of determining that the total number of resources included into the measurement report is lower than the maximum RAT resource reporting value. In such a case, further RAT resources may be included into the report. In particular, one further resource may be included into the measurement report, wherein the further resource is associated with a RAT having a RAT resource reporting value greater than 0. The further resource and any other further resources may be included one by one from the different lists of valid neighbour resources associated with the plurality of RATs in accordance to the RAT sequence.

According to a further aspect, a method for preparing a measurement report on network resources in the vicinity of a multi-RAT mobile station is described. The MS may be operated in a cellular telecommunications network. The MS may support a plurality of radio access technologies, as outlined above. Furthermore, the MS may comprise a maximum RAT resource reporting value indicating the total number of resources to be included into the measurement report. The maximum RAT resource reporting value may have been received at the MS e.g. from the network. As outlined above, the maximum RAT resource reporting value may be greater than one.

The method may comprise the act of receiving a GSM cell parameter at the MS indicative of a number of valid GSM cells to be included into the report. Furthermore, the method may comprise the step of including a number of resources associated with the plurality of RATs into the measurement report, wherein the number is equal to or less than the maximum RAT resource reporting value reduced in accordance to the GSM cell parameter. The act of including resources into the report may be performed according to any of the aspects outlined in the present document.

According to another aspect, a multi-RAT mobile station (MS) is described. The MS may be configured to connect to a digital cellular telecommunications network, e.g. via a BSS. The MS may be configured to support a plurality of RATs and to prepare a measurement report on network resources in the vicinity of the MS according to any of the methods and aspects outlined in the present document. Furthermore, the method may be configured to provide the measurement report to the digital cellular telecommunications network.

According to a further aspect, a software program is described. The software program may be stored on a computer-readable medium (which may be tangible or otherwise non-transitory) as instructions that are adapted for execution on a processor and for performing the aspects and features outlined in the present document when carried out on a computing device.

According to another aspect, a storage medium comprising a software program is described. The storage medium may be memory (e.g. RAM, ROM, etc.), optical media, magnetic media and the like. The software program may be adapted for execution on a processor and for performing the aspects and features outlined in the present document when carried out on a computing device.

According to a further aspect, a computer program product is described. The computer program product may comprise executable instructions for performing the aspects and features outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

BRIEF DESCRIPTION OF THE DRAWINGS

The aspects outlined in the present document are explained below in an exemplary manner with reference to the accompanying drawings, wherein.

DETAILED DESCRIPTION

Figure 1:
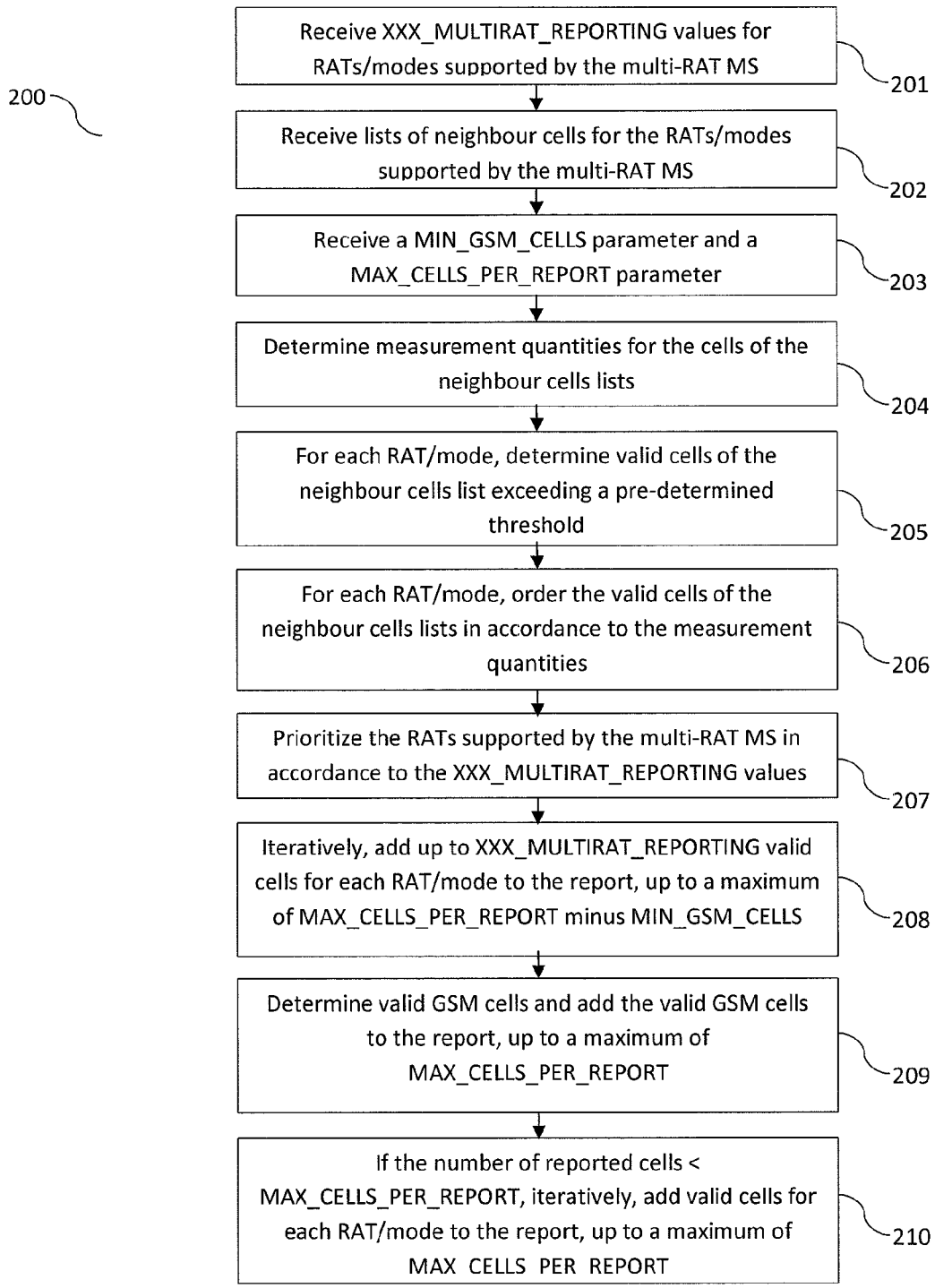
FIG. 1 is a flow diagram of an example method for selecting neighbour cells of an MS to be included into a measurement report.

As outlined above, a multi-RAT MS should be able to provide measurement reports to the digital cellular telecommunications system with regards to some or all of the RATs supported by the MS. The cellular telecommunications system may provide a so called XXX_MULTIRAT_REPORTING parameter to the MS for some or all of the radio access technologies and/or radio access modes supported by the MS. In the present document reference will be made to RATs which should include the different RATs and RAT modes.

The XXX in the XXX_MULTIRAT_REPORTING parameter is a placeholder for the particular radio access technology, i.e. XXX is substituted by letters indicating a specific radio access technology and/or RAT mode, e.g. "FDD" (for UTRAN FDD), "TDD" (for UTRAN TDD), "CDMA2000" for CDMA2000, and "E-UTRAN" for E-UTRAN. By way of example, the specific parameter related to E-UTRAN is E-UTRAN_MULTIRAT_REPORTING. The parameter XXX_MULTIRAT_REPORTING may be a two bit value that can take on values [0 . . . 3]. A value "0" indicates that no neighbouring cell associated with the particular RAT needs to be reported, and a value "3" indicates that up to three neighbouring cells associated with the particular RAT should be reported.

A multi-RAT MS shall report the number of best valid cells from the neighbour cell list of a RAT or on frequencies contained in the E-UTRAN Neighbour Cell list, indicated by the value of XXX_MULTIRAT_REPORTING parameter. In other words, the XXX_MULTIRAT_REPORTING parameter indicates that the MS should report "0" to "3" neighbouring cells and/or frequencies contained in the neighbouring cells for a given radio access technology.

As outlined above, a multi-RAT MS is an MS that supports at least one other radio access technology in addition to GSM (e.g. GSM and UTRAN FDD; or GSM, UTRAN FDD and E-UTRAN; or GSM and CDMA2000, etc.). Generally speaking, a multi-RAT MS is an MS supporting GSM and at least one of UTRAN FDD, UTRAN TDD, E-UTRAN, CDAM2000, etc. A multi-RAT MS may be required to report the number of best valid cells in each supported other (non-GSM) radio access technology/mode comprised within the neighbour cell list or on frequencies contained in the E-UTRAN Neighbour Cell list, according to the value of the appropriate XXX_MULTIRAT_REPORTING parameter.

The neighbour cell list, the E-UTRAN Neighbour Cell list (which is actually a list of frequencies served within the respective neighbour cells), and the parameters XXX_MULTIRAT_REPORTING are provided by the network, e.g. via a BSS, to the MS. The above information may be broadcasted to all MS served by the particular BSS. Alternatively or in addition, the information may be transmitted point-to-point to the particular MS. As such, the network, i.e. the BSS and/or the MSC, provides a particular MS with information on the network resources within the vicinity of the MS and with information on the content of a measurement report that the network expects from the MS.

Using this information, the MS performs measurements on the quality of coverage of the cells listed within the neighbour cell list and the E-UTRAN neighbour cell list. For each of the radio access technologies a set of measurement quantities may be defined, wherein the measurement quantities may indicate a signal to noise ratio and/or a channel power provided by a particular cell. For UTRAN FDD cells, the measurement quantities may be CPICH Ec/No and CPICH RSCP (Received Signal Code Power). The CPICH Ec/No (Common Pilot Channel Ec/No) parameter indicates a ratio of energy per modulating bit to the noise spectral density. The measurement requirements for these quantities are defined in 3GPP TS 25.133 which is incorporated by reference. For UTRAN TDD cells, the measurement quantity may be P-CCPCH RSCP (Primary Common Control Physical Channel, Received Signal Code Power). The measurement requirements for this quantity are defined in 3GPP TS 25.123 which is incorporated by reference. For CDMA2000 cells, the measurement quantity may be PILOT_STRENGTH of the pilot. The measurement requirements for this quantity are defined in TIA/EIA/IS-2000-5-A which is incorporated by reference.

For E-UTRAN FDD cells, the measurement quantities may be RSRP (Primary Common Control Physical Channel) and RSRQ (Reference Signal Received Quality). The measurement requirements for these quantities are defined in 3GPP TS 36.133 which is incorporated by reference.

The MS determines values for the above mentioned measurement quantities and determines if the measurement quantities exceed predetermined threshold values. Typically only those cells from the neighbour list/E-UTRAN neighbour list which exceed one or more of these predetermined threshold values are reported by the MS. By way of example, for UTRAN FDD, only cells with a reported value (CPICH Ec/No or CPICH RSCP) equal or higher than a threshold FDD_REPORTING_THRESHOLD and a non-reported value (from CPICH Ec/No and CPICH RSCP) equal or higher than another threshold FDD_REPORTING_THRESHOLD_2, may be reported. For UTRAN TDD, only cells with a reported value (P-CCPCH RSCP) equal or higher than TDD_REPORTING_THRESHOLD may be reported. For E-UTRAN FDD or E-UTRAN TDD, when 6-bit measurement reporting is used, only cells with a reported value (RSRP or RSRQ) equal or higher than E-UTRAN_FDD_REPORTING_THRESHOLD or E-UTRAN_TDD_REPORTING_THRESHOLD and with a non-reported value (from RSRP and RSRQ) equal or higher than E-UTRAN_FDD_REPORTING_THRESHOLD_2 or E-UTRAN_TDD_REPORTING_THRESHOLD_2, respectively, may be reported. When 3-bit measurement reporting is used only cells with a measured value (RSRP and RSRQ) equal or higher than E-UTRAN_FDD_MEASUREMENT_REPORT_OFFSET or E-UTRAN_TDD_MEASUREMENT_REPORT_OFFSET and with a non-reported value (RSRP or RSRQ) equal or higher than E-UTRAN_FDD_REPORTING_THRESHOLD_2 or E-UTRAN_TDD_REPORTING_THRESHOLD_2, respectively, may be reported.

In order to limit the bandwidth required for transmitting the measurement report from the MS to the network, typically only a limited number of cells can be reported within a measurement report. This limited number of cells may be referred to as a maximum cell reporting number. By way of example, the measurement report can hold reports from up to six different cells, i.e. the maximum cell reporting number may be six. Due to this limitation, an appropriate selection of cells for the measurement report from the different lists of neighbour cell lists should be performed.

The report may be constructed as follows: In a first step (step 1), cells for which XXX_MULTIRAT_REPORTING>0 and for which the respective measurement quantities exceed certain thresholds could be included in the measurement report. In other words, it may be determined for which RAT, cells should be reported by the MS (as indicated by a parameter XXX_MULTIRAT_REPORTING>0 for the respective radio access technology). Subsequently, the measurement quantities for cells from the neighbour cell list associated with the respective radio access technology are determined Only those cells which exceed the one or more predetermined thresholds for the measurement quantities should be reported by the MS. I.e. the MS selects a number XXX_MULTIRAT_REPORTING of cells for which the measurement quantities exceed certain thresholds.

In a second step (step 2), if there are still unused positions in the report (i.e. if the number of cells selected in the first step does not exceed the maximum cell reporting number), then the best GSM cells within the neighbourhood of the MS may be added to the report.

Finally, in a third step (step 3), if there are still remaining positions within the report subsequent to the second step, the remaining positions may be used to report the next best valid cells (i.e. those cells meeting the threshold requirements of the first step) in other radio access technologies for which the parameter XXX_MULTIRAT_REPORTING is non-zero, but that were not included in the first step because XXX_MULTIRAT_REPORTING cells had already been included for that RAT. This means, the measurement report may comprise a higher number of cells in a certain RAT than indicated in the parameter XXX_MULTIRAT_REPORTING, if the third step is executed.

When the MS is measuring cells of more than one RAT (e.g. UTRAN FDD and E-UTRAN) and the number of cells that fulfil the reporting requirements (i.e. that have a measurement quantity exceeding the pre-determined threshold) is larger than the number of positions available in the measurement report (i.e. the reporting number), the above mentioned rules do not specify which of these cells the MS should include in the measurement report. This problem can arise in two situations: If in the first step of the above mentioned cell reporting procedure a number of cells higher than the maximum cell reporting number fulfil the reporting requirements, it is not specified which subset of a size corresponding to the maximum cell reporting number (e.g. of size six) of these cells the MS should include within the report. Similarly, if in the third step of the above mentioned cell reporting procedure, there are more cells to be reported than available positions, it is unspecified which cells should be included within the report.

These problems may arise in typical network deployments/settings, because the network typically broadcasts the values of the parameter XXX_MULTIRAT_REPORTING. Consequently, the broadcasted parameter values may be used by all MS which receive the broadcasted parameter values, irrespective of the set of RATs/modes supported by the different MS. This means that for a device supporting a high number of RATs/modes, the number of cells meeting the requirements of the first step of the above mentioned reporting procedure, and/or the sum of the values of the different parameters XXX_MULTIRAT_REPORTING may exceed the number of cells to be reported within a measurement report. By way of example, the network may wish that a dual-mode GSM/UTRAN-TDD device (respectively GSM/UTRAN-FDD device) reports 3 UTRAN cells if possible, and therefore indicates a parameter TDD_MULTIRAT_REPORTING=3 (respectively FDD_MULTIRAT_REPORTING=3). It may further wish that a dual-mode GSM/E-UTRAN device reports 2 E-UTRAN cells, if possible, and therefore indicates a parameter E-UTRAN_MULTIRAT_REPORTING=2. However, these values will typically also be used by a multi-mode GSM/UTRAN TDD/UTRAN FDD/E-UTRAN device, which may then find itself with only 6 positions to report up to 8 cells (i.e. 3 UTRAN TDD cells+3 UTRAN FDD cells+2 E-UTRAN cells).

In the following, different ways of selecting a subset of cells will be outlined. A possible way to perform the selection of the cells to be reported may be based on a comparison of measures of the received signal level in the different radio access technologies/modes. This means that the values obtained for the measurement quantities of the different cells associated with the different RATs/modes may be compared with one another. The selection may also be based on a comparison of a received signal level and received signal quality in the different radio access technologies/modes.

The main drawback of these solutions is that the comparison is done based on measurement results across different radio access technologies/modes. However, the measurement quantities for the different radio access technologies/modes may not be comparable. In particular, there is no evidence that a cell in a first RAT/mode is more "suitable" than a cell in a second RAT/mode if one of the proposed values for comparison, i.e. one of the measurement quantities, in the first RAT/mode is larger then the proposed value for comparison in the second RAT/mode. In other words, it has not been demonstrated that any metrics derived from measurement results are directly comparable for cells of different RATs/modes.

A risk with the above mentioned reporting procedures is that they may cause no cells in a given RAT to be reported, even though there are one or more cells on that RAT which meet measurement reporting criteria, simply because of the relative values of the measurement quantities of those cells are compared to those of other RATs. If the network has a particular preference to perform handover/cell change order to this particular RAT, then the network may not be able to determine the appropriate target cell if it does not receive measurement reports for cells of this RAT.

As such, alternative methods for selecting cells to be reported by the MS are desirable. These methods should avoid the above mentioned drawbacks. In particular, these methods should ensure an appropriate reporting across the different RATs supported by the MS. The underlying principle of these alternative methods is to base the selection regarding the cells to be reported on the requested number of cells which are to be reported (as indicated by e.g. the parameter XXX_MULTIRAT_REPORTING). Furthermore, the selection of a cell of a particular RAT should be independent of the measurement quantities associated with other RATs. In particular, only measurement quantities relating to the same RAT/mode should be taken into account when selecting a cell associated with this particular RAT/mode.

The above mentioned cell reporting procedure comprising a first, second and third step may be amended as will be described in the following. The first step (step 1) of the above mentioned procedure comprises the inclusion of cells of RATs/modes in the measurement report, for which certain measurement quantities exceed the thresholds and for which the parameter XXX_MULTIRAT_REPORTING is non-zero. The cells to be included in the measurement report in this first step may be selected according to the following procedure:

step 1.1: For each RAT/mode the best valid cell is included in the report.

step 1.2: If there are further positions available in the report and if there are further cells to be reported available, the MS reports the next best cell on each RAT/mode. In case the MS has more cells to report than remaining positions in the measurement report, priority is given to cells from RATs with higher XXX_MULTIRAT_REPORTING value. In case of equal values of XXX_MULTIRAT_REPORTING, the priority given to the cells associated with the RATs may be an MS implementation choice.

1.3: Repeat step 1.2 until all positions of the report are filled (i.e. the capacity of the report is exhausted) or no more cells are to be reported (i.e. for each RAT/mode, a number of cells equal to XXX_MULTIRAT_REPORTING have been included in the report).

In mathematical terms, the above mentioned selection procedure comprising steps 1.1 to 1.3 may be characterized as follows:

Let

X_M_R(i) be the value of XXX_MULTIRAT_REPORTING for a RAT i, with i=1, ..., N_RAT, N_RAT be the number of RATs/modes supported by the MS, N(i) be the number of valid cells that the MS has measured on RAT i, N_R(i) be the number of cells included in the report for RAT i, and MAX_CELLS_PER_REPORT be the total number of cells per report (typically 6), then the selection procedure may be written as shown in Table 1:

TABLE 1 j = N_RAT;    %initialize the counter identifying a particular RAT;
while (sum(N_R(i))< MAX_CELLS_PER_REPORT) && there exists k such that N_R(k) < N(k) && N_R(k) < X_M_R(k))
    j = j + 1; if j > N_RAT, j = 1; % sequentially select a RAT;
    if N_R(j) < N(j) and N_R(j) < X_M_R(j)    % check if there are still measurements regarding valid cells available for RAT j and that the required number of cells has not yet been reported;
        N_R(j) = N_R(j) + 1 % add one cell for RAT j to the report;
end while loop;

It should be noted that preferably the valid cells of a RAT are ranked in accordance to their measurement quantities, and that at each iteration the highest ranking cell of the RAT which has not yet been reported will be included into the report. Furthermore, it is preferable to rank the RATs in accordance to the values of the XXX_MULTIRAT_REPORTING parameter. Consequently, the iterative selection procedure of Table 1 will start selecting a cell from the highest ranking RAT.

As outlined above, the second step (step 2) of the above mentioned cell reporting procedure relates to the selection of GSM cells if there are still available positions within the report. This second step may remain unchanged.

The third step (step 3) of the above mentioned cell reporting procedure relates to the further inclusion of cells of RATs/modes in the measurement report for which the measurement quantities exceed the thresholds and for which XXX_MULTIRAT_REPORTING is non-zero. The cells to be included in the measurement report in this third step may be selected according to the following procedure:

step 3.1: The MS reports the next best valid cell on each RAT/mode. Priority is given to cells from RATs with higher XXX_MULTIRAT_REPORTING value. In case of equal values of the parameter XXX_MULTIRAT_REPORTING, the selection may be an MS implementation choice.

step 3.2: Repeat step 3.1 until all positions are filled (i.e. the capacity of the report is exhausted) or no more cells are to be reported (i.e. there are no more cells whose measurement values exceed the threshold).

In mathematical terms, this procedure may be characterized as follows:

Let

X_M_R(i) be the value of XXX_MULTIRAT_REPORTING for a RAT i (as above, "i" is an index indicating a particular RAT i), N(i) be the number of valid cells that the MS has measured on RAT i, N_R(i) be the number of cells determined to be in the report for RAT i;

MAX_CELLS_PER_REPORT be the total number of cells per report (6 typically), and

N_RAT be the number of RATs/modes supported by the MS, then the selection procedure may be written as shown in Table 2:

TABLE 2 j = N_RAT    %initialize the counter identifying a particular RAT;
while (sum(N_R(i))< MAX_CELLS_PER_REPORT)
    j = j + 1, if j > N_RAT, j = 1    % sequentially select a RAT;
    if N_R(j) < N(i)        % check if there are still valid cells available for RAT j which have not yet been reported;
        N_R(j) = N_R(j) + 1 % add one cell for RAT j to the report;
end while loop;

In a similar manner to the selection procedure of Table 1, the valid cells of a RAT may be ranked in accordance to the measurement quantities of the RAT. Furthermore, the RATs may be ranked in accordance to the values of the XXX_MULTIRAT_REPORTING parameter. As such, at each iteration, the remaining highest ranking cell of a RAT can be included into the report. Furthermore, each iteration can be performed for the different RATs in descending order of the ranking of the RATs.

In the following, several examples will be provided to illustrate the way how the amended cell reporting procedure works.

Example 1

It is assumed that the report comprises 6 positions for the reporting of neighbour cells. The measurements of the MS have detected no valid GSM cells to report. Apart from GSM, the multi-RAT MS is enabled for UTRAN FDD, UTRAN TDD and E-UTRAN. The XXX_MULTIRAT_REPORTING parameter values for the different RATs are X_M_R=1, 1, and 2, respectively. In accordance to the XXX_MULTIRAT_REPORTING parameter values, priorities are assigned to the different RATs, i.e. i=3, 2, 1, respectively. As a result of the measurements, the MS has identified N=4, 6, and 8, valid cells for the different RATs, respectively.

When executing the first step (including the amended steps 1.1, 1.2 and 1.3), a first E-UTRAN cell (having the highest measurement quantity of the E-UTRAN neighbour cells) is selected for reporting, followed by a UTRAN TDD and a UTRAN FDD cell (having the highest measurement quantity of the UTRAN TDD and the UTRAN FDD neighbour cells, respectively). Subsequently, a second E-UTRAN cell is selected for reporting (having the second highest measurement quantity of the E-UTRAN neighbour cells). As an outcome of the execution of the amended first step, X_M_R(1)=2 E-UTRAN cells, X_M_R(2)=1 UTRAN TDD cells and X_M_R(3)=1 UTRAN-FDD cells have been selected for reporting.

In view of the fact that the number of selected cells (four) is lower than the number of positions within the measurement report (six), the method proceeds with the execution of the second step. However, as the MS has not detected any valid GSM cell, the method proceeds with the amended third step (including steps 3.1 and 3.2). The RAT having the highest priority is chosen, i.e. E-UTRAN, and a third E-UTRAN cell (having the third highest measurement quantity of the E-UTRAN neighbour cells). Finally, the RAT having the next highest priority is chosen, i.e. UTRAN TDD, and a further UTRAN TDD cell is selected for reporting (having the second highest measurement quantity of the UTRAN TDD neighbour cells).

As such, three E-UTRAN, two UTRAN TDD and one UTRAN FDD cells are selected for reporting. This is illustrated by the "X" signs in the final N_R column of Table 3a. The subscript of the "X" signs indicates the order in which the different cells have been selected by the amended cell reporting procedure.

TABLE 3a

| RAT | X_M_R | N(i) | assigned value of i to ensure ordering | Final N_R |
|---|---|---|---|---|
| FDD | 1 | 4 | 3 | $X_3$ |
| TDD | 1 | 6 | 2 | $X_2 X_6$ |
| E-UTRAN | 2 | 8 | 1 | $X_1 X_4 X_5$ |

Example 2

(assuming 6 positions available in the report and assuming that 1 valid GSM cell to report has been detected by the MS)

TABLE 3b

| RAT | X_M_R | N(i) | assigned value of i to ensure ordering | Final N_R |
|---|---|---|---|---|
| FDD | 1 | 4 | 3 | $X_3$ |
| TDD | 1 | 6 | 2 | $X_2$ |
| E-UTRAN | 2 | 8 | 1 | $X_1 X_4 X_6$ |

Example 3

(assuming 6 positions available in the report and assuming that 1 valid GSM cell to report has been detected by the MS)

TABLE 3c

| RAT | X_M_R | N(i) | assigned value of i to ensure ordering | Final N_R |
|---|---|---|---|---|
| FDD | 1 | 4 | 3 | $X_2 X_6$ |
| TDD | 1 | 0 | 2 | |
| E-UTRAN | 2 | 6 | 1 | $X_1 X_3 X_5$ |

Example 4

(assuming 6 positions available in the report and assuming that 1 valid GSM cell to report has been detected by the MS)

TABLE 3d

| RAT | X_M_R | N(i) | assigned value of i to ensure ordering | Final N_R |
|---|---|---|---|---|
| FDD | 1 | 4 | 3 | $X_2 X_6$ |
| TDD | 1 | 0 | 2 | |
| E-UTRAN | 3 | 6 | 1 | $X_1 X_3 X_4$ |

Example 5

(assuming 6 positions available in the report and assuming that 1 valid GSM cell to report has been detected by the MS). Note that due to the high XXX_MULTIRAT_REPORTING parameter values which add up to more than the number of positions within the report, the report is filled within the amended first step of the reporting procedure. Consequently, no GSM cell is included within the report.

TABLE 3e

| RAT | X_M_R | N(i) | assigned value of i to ensure ordering | Final N_R |
|---|---|---|---|---|
| FDD | 3 | 4 | 2 | $X_2 X_5$ |
| TDD | 1 | 5 | 3 | $X_3$ |
| E-UTRAN | 3 | 6 | 1 | $X_1 X_4 X_6$ |

As can be seen in example 5, i.e. in Table 3e, if the sum of the XXX_MULTIRAT_REPORTING parameter values for the RATs supported by a multi-RAT MS exceeds the number of positions available within the report, the reporting procedure will not selected any GSM cells, even if valid GSM cells have been detected by the MS.

Alternatively or in addition to the amendments to the cell reporting procedure outlined above, it may therefore be beneficial to introduce a parameter which indicates either the minimum number of GSM cells to be reported (e.g. a MIN_GSM_CELLS parameter), or similarly the maximum number of non-GSM cells to be reported (e.g. a MAX_NON_GSM_CELLS parameter). As a result of this new parameter, the network can set and broadcast relatively high values for the XXX_MULTIRAT_REPORTING parameter, in order to accommodate devices that only support a few (e.g. two) RATs/modes, while avoiding the risk that devices that support more (e.g. three or more) RATs/modes only report non-GSM cells at the expense of GSM cells.

As an example, consider a modified version of example 5 above, with the parameter MIN_GSM_CELLS=1 (assuming 6 positions available in the report and assuming that 1 valid GSM cell to report has been detected, with MIN_GSM_CELLS=1).

The amended first step of the reporting procedure (including steps 1.1, 1.2, and 1.3) is executed as outlined above. However, due to the parameter MIN_GSM_CELLS=1, the positions of the report are filled up only to MAX_CELLS_PER_REPORT minus MIN_GSM_CELLS. When the reduced number of positions is filled, the first step is terminated and the procedure proceeds with step 2. If one or more valid GSM cell has been detected, these cells are included within the report, as long as the total number of reporting positions MAX_CELLS_PER_REPORT is not exceeded. In the present example, one valid GSM cell is added to the report. If there were still positions left within the report, the procedure would proceed with amended step 3.

TABLE 3f

| RAT | X_M_R | N(i) | assigned value of i to ensure ordering | Final N_R |
|---|---|---|---|---|
| FDD | 3 | 4 | 2 | $X_3 X_5$ |
| TDD | 1 | 5 | 3 | $X_2$ |
| E-UTRAN | 3 | 6 | 1 | $X_1 X_4$ |

FIG. 1 illustrates a flow chart of an example method 200 for selecting neighbour cells of a multi-RAT MS for a measurement report to be sent to the cellular network. In an initial phase, the multi-RAT MS receives information from the network (e.g. via the current BSS) regarding the measurement report which is to be established. In step 201, the multi-RAT MS receives XXX_MULTIRAT_REPORTING parameter values for each RAT/mode supported by the multi-RAT MS. Furthermore, in step 202, the MS receives a plurality of lists of neighbour cells corresponding to the plurality of RATs/ modes supported by the MS. It should be noted that the lists of neighbour cells may be a lists of frequencies (as is the case e.g. for E-UTRAN). In step 203, the MS receives information regarding the size of the measurement report, notably a value of the MAX_CELLS_PER_REPORT parameter indicating the maximum number of cells which are to be reported within the measurement report and a value of the MIN_GSM_CELLS parameter, indicating at least how many of the reported cells should be GSM cells. It should be noted that some or all of these parameter values or lists could already be available at the MS, thereby making a receiving step obsolete.

In step 204, the MS proceeds with the determination of measurement quantities for the cells from the lists of neighbour cells. Typically, for each RAT/mode a set of one or more measurement quantities indicating the quality of a connection of the MS are specified. Using the determined measurement quantities, a plurality of sub-lists of valid cells is determined for the plurality of supported RATs/modes, respectively. Valid cells are cells for which the determined measurement quantities exceed one or more pre-determined thresholds. As an outcome of step 205, a different sub-list of valid cells from the list of neighbour cells is obtained for each of the supported RATs/modes.

In step 206, the sub-lists of valid cells are ordered in accordance to the determined measurement quantities. This is performed separately for each RAT/mode. In other words, the determined values of the measurement quantities of the valid cells of a particular RAT/mode are compared and ordered such that the cells providing the highest values of the measurement quantities appear first in the sub-list of valid cells. Furthermore, in step 207, the different RATs/modes are prioritized with respect to one another. The prioritization may be performed in accordance to the received values of the XXX_MULTIRAT_REPORTING parameter. This means that a RAT/mode for which a higher number of cells are to be reported to the network should have a higher priority than a RAT/mode having a lower value of the XXX_MULTIRAT_REPORTING parameter.

In step 208, the cells to be reported are selected from the plurality of sub-lists of valid cells in an iterative manner. The iterative process for selecting the cells is outlined in steps 1.1, 1.2, and 1.3, as well as in Table 1 of the present document. This means that one by one, starting with the RAT/mode having the highest priority, a cell associated with a particular RAT/mode is added to the report, as long as the number of reported cells of the RAT/mode does not exceed the value of the XXX_MULTIRAT_REPORTING parameter and as long as the total number of reported cells does not exceed MAX_CELLS_PER_REPORT minus MIN_GSM_CELLS. For each RAT/mode, the first cell of the sub-list of valid cells which is not yet reported is added to the report. In other words, for each RAT/mode, the cells are added to the report in descending order of the values of their measurement quantities. After having added a cell from a particular RAT/mode, the method proceeds to the RAT/mode having the next lower priority and adds another cell, subject to the conditions outlined above. If there is no more RAT/mode having a lower priority, the method re-commences with the RAT/mode having the highest priority. Step 208 is terminated if for all the RATs/modes the number of reported cells equals the value of the corresponding XXX_MULTIRAT_REPORTING parameter or if the number of reported cells equals MAX_CELLS_PER_REPORT minus MIN_GSM_CELLS.

Step 209 corresponds to the second step of the reporting procedure outlined above and may comprise the determination of valid GSM cells. The valid GSM cells are added to the report, as long as the maximum number of cells in the report, i.e. MAX_CELLS_PER_REPORT, has not been reached.

If, subsequent to step 209, the number of reported cells is smaller than MAX_CELLS_PER_REPORT, i.e. smaller than the maximum number of reported cells, further cells of the sub-lists of valid cells may be added to the report. This may be done iteratively in accordance to the steps 3.1 and 3.2, as well as Table 2, outlined above. Starting from the RAT/mode having the highest priority, one by one the highest ranking cells of the sub-lists, which have not yet been added to the report, will be added to the report, up to a maximum of MAX_CELLS_PER_REPORT.

Figure 2:
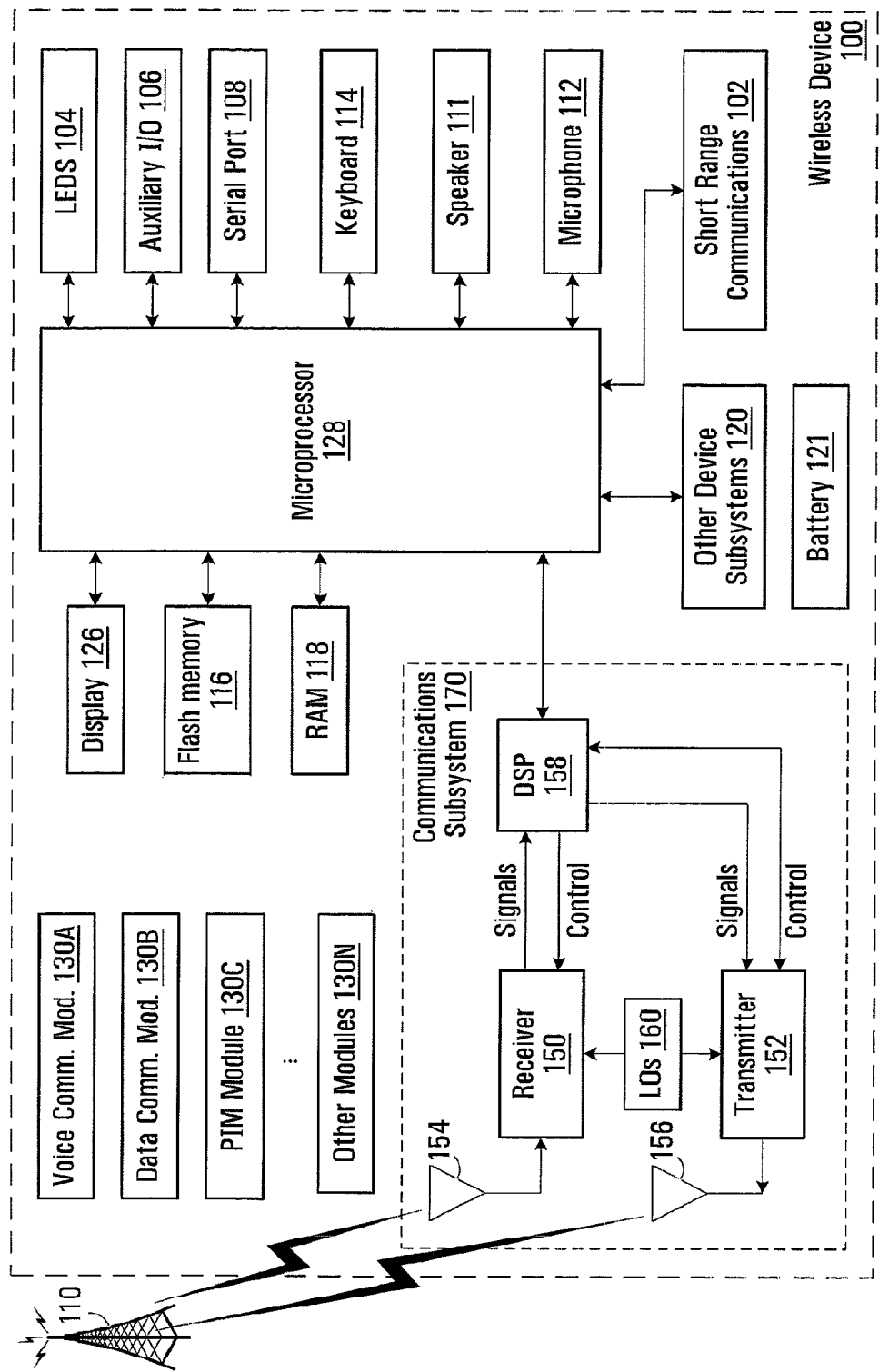
FIG. 2 is a block diagram of an example implementation of a mobile station.

Referring now to FIG. 2, shown is a block diagram of a mobile station, user equipment or wireless device 100 that may, for example, implement any of the methods described in this disclosure. It is to be understood that the wireless device 100 is shown for exemplary purposes only. A processing device (a microprocessor 128) is shown schematically as coupled between a keyboard 114 and a display 126. The microprocessor 128 controls operation of the display 126, as well as overall operation of the wireless device 100, in response to actuation of keys on the keyboard 114 by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™, GERAN or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. As such, the wireless device 100 may support multiple radio access technologies such as UTRAN-TDD, UTRAN-FDD, E-UTRAN, CDMA 2000. The communication subsystem 170 may also be designed to operate with an 802.11 Wi-Fi network, and/or an 802.16 WiMAX network. Other types of data and voice networks, both separate and integrated, may also be utilized with the wireless device 100.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

In a particular embodiment, one or more of the above-described methods for providing a measurement report to a corresponding base station 110 are implemented by the communications subsystem 170, the microprocessor 128, the RAM 118, and the data communications module 130B, collectively appropriately configured to implement one of the methods described herein.

Figure 3:
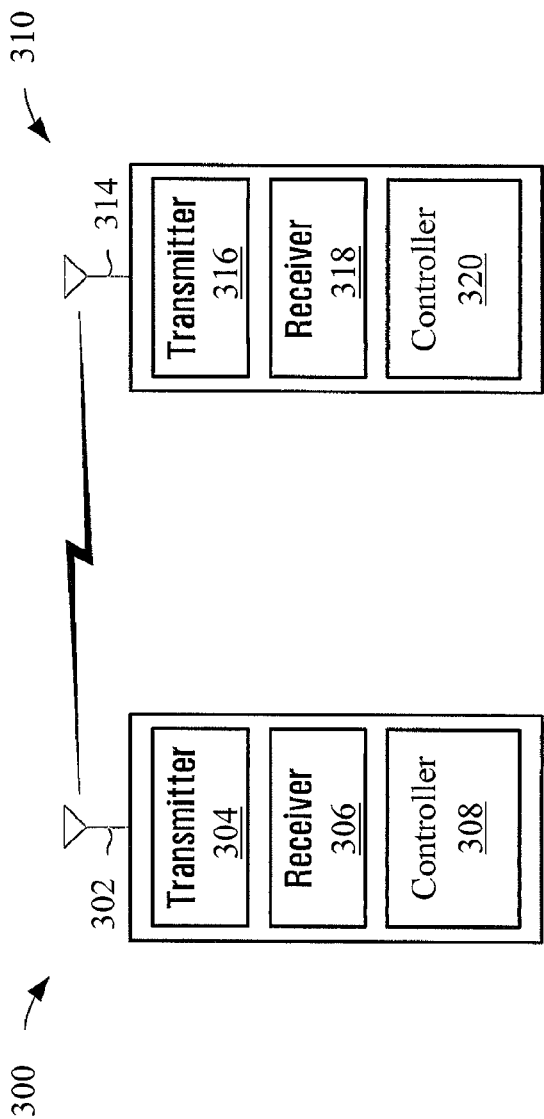
FIG. 3 is a block diagram of an example network comprising a mobile station and a base station.

FIG. 3 is a block diagram of a system within which one or more of the embodiments described above may be implemented. There is a mobile station 300 in wireless communication with a network, as represented by network device or base station 310. As outlined in the context of FIG. 11, the mobile station 300 has at least one antenna 302, a transmitter 302 and a receiver 304 (which may be implemented together as a transceiver) and a controller 308. The network device or base station 310 has at least one antenna 314, a transmitter 316 and a receiver 318 (which may be implemented together as a transceiver) and a controller 320. The controllers 308, 320 may be implemented in hardware, or a combination of software and hardware, for example software running on a processor.

In the present document several methods and systems for generating a measurement report of a multi-RAT MS have been outlined. The described methods do not use cross-RAT comparisons when determining which cells to report. Furthermore, the described methods ensure that, as far as possible, at least one cell from each RAT for which there are valid cells available to report and for which XXX_MULTI-RAT_REPORTING>0 will be reported. This avoids the potential issue that because of the values of the measurement quantities, one or more RATs will be entirely excluded from a report. Furthermore, the described methods can be used to ensure that the reporting of non-GSM cells does not prevent the reporting of GSM cells.

The methods and systems described in the present document may be implemented as software, firmware and/or hardware. Certain components may e.g. be implemented as software running on a digital signal processor or microprocessor. Other components may e.g. be implemented as hardware or as application specific integrated circuits. The signals encountered in the described methods and systems may be stored on media such as random access memory or optical storage media. They may be transferred via networks, such as radio networks, satellite networks or wireless networks. Typical devices making use of the methods and systems described in the present document are mobile stations such as mobile telephones or smartphones. On the network side, the methods and systems may be used in base station equipment.

What is claimed is:

1. A method for preparing a measurement report on network resources, referred to as resources, in the vicinity of a multi-RAT mobile station, referred to as MS, wherein the MS supports a plurality of radio access technologies, referred to as RATs, the method comprising:

receiving a plurality of RAT resource reporting values, each RAT resource reporting value indicating a number of resources of a corresponding RAT to be included into the measurement report;

determining a plurality of lists of valid neighbor resources associated with the plurality of RATs; and including resources from the plurality of lists of valid neighbor resources into the measurement report according to a RAT sequence specifying an ordering of the RATs in the plurality of RATs, wherein a second resource of a given RAT is not included into the measurement report until after a respective first resource for each one of the plurality of RATs for which the RAT resource reporting value is greater than zero has already been included into the measurement report according to the RAT sequence.

2. The method of claim 1, further comprising determining at least one measurement quantity for each of the resources of a plurality of lists of neighbor resources, the plurality of lists of neighbor resources corresponding to the plurality of RATs supported by the MS, wherein a type of the at least one measurement quantity of a respective resource for a respective RAT is dependent on the respective RAT and is indicative of a quality of a connection between the MS and the respective resource.

3. The method of claim 2, wherein the plurality of lists of valid neighbor resources is determined from the corresponding lists of neighbor resources, wherein for each respective resource in the plurality of lists of valid neighbor resources the determined at least one measurement quantity exceeds at least one threshold value, wherein the at least one threshold value is dependent on the respective RAT associated with the respective resource.

4. The method of claim 3, further comprising ranking the resources within the plurality of lists of valid neighbor resources in accordance to the at least one measurement quantity determined for the resources, wherein the resources included into the measurement report correspond to highest ranking resources of their respective lists of valid neighbor resources.

5. The method of claim 2, wherein the at least one measurement quantity of the respective resource is indicative of at least one of a signal-to-noise ratio or a signal strength, which is achieved when operating the MS using the respective resource.

6. The method of claim 1, wherein the RAT sequence is determined by ranking the plurality of RATs in accordance to the respective plurality of RAT resource reporting values.

7. The method of claim 1, wherein the including comprises, for a particular RAT from the plurality of RATs having a RAT resource reporting value which is greater than a number of resources of the particular RAT that have already been included into the measurement report, including another resource of the respective list of valid neighbor resources associated with the particular RAT into the measurement report.

8. The method of claim 1, wherein the including comprises:
selecting a current RAT from the plurality of RATs in accordance to the RAT sequence; and
if a number of resources of the current RAT which have already been included into the measurement report is lower than the respective RAT resource reporting value corresponding to the current RAT, including another resource from the plurality of valid resources associated with the current RAT into the measurement report.

9. The method of claim 8, wherein the including further comprises, subject to an iteration during which one resource has been included into the measurement report for each respective RAT of the plurality of RATs for which a respective number of resources that had previously been included into the measurement report is lower than the respective RAT resource reporting value corresponding to the respective RAT, performing a further iteration.

10. The method of claim 1, wherein the MS further comprises a maximum RAT resource reporting value indicating a total number of resources to be included into the measurement report, wherein the maximum RAT resource reporting value is greater than one.

11. The method of claim 10, further comprising:
subject to including a resource into the measurement report, determining a total number of resources presently included into the measurement report; and
terminating the including if the total number of resources presently included into the measurement report corresponds to the maximum RAT resource reporting value or if for each respective RAT, a respective number of resources included into the measurement report for the respective RAT corresponds to a lower one of the respective RAT resource reporting value and a number of resources in the respective list of valid neighbor resources corresponding to the respective RAT.

12. The method of claim 1, wherein the MS supports GSM.

13. The method of claim 12, wherein the MS further comprises a maximum RAT resource reporting value indicating a total number of resources to be included into the measurement report, wherein the maximum RAT resource reporting value is greater than one, and further comprising including a valid GSM cell into the measurement report, subject to including in the measurement report, for each respective RAT, a respective number of resources corresponding to a lower one of the respective RAT resource reporting value and a number of resources in the respective list of valid neighbor resources corresponding to the respective RAT.

14. The method of claim 12, further comprising receiving a GSM cell parameter at the MS indicative of a number of valid GSM cells to be included into the report.

15. The method of claim 14, wherein the MS further comprises a maximum RAT resource reporting value indicating a total number of resources to be included into the measurement report, wherein the maximum RAT resource reporting value is greater than one, and further comprising:
subject to including a resource into the measurement report, determining a total number of resources presently included into the measurement report; and
terminating the including if the total number of resources presently included into the measurement report corresponds to the maximum RAT resource reporting value or if for each respective RAT, a respective number of resources included into the measurement report for the respective RAT corresponds to a lower one of the respective RAT resource reporting value and a number of resources in the respective list of valid neighbor resources corresponding to the respective RAT, wherein the including is terminated if the total number of resources corresponds to the maximum RAT resource reporting value reduced in accordance to the GSM cell parameter or if for each respective RAT, the respective number of resources included into the measurement report corresponds to a lower one of the respective RAT resource reporting value and a number of resources in the respective list of valid neighbor resources corresponding to the respective RAT.

16. The method of claim 13, further comprising:
   determining that the total number of resources included into the measurement report is lower than the maximum RAT resource reporting value; and
   including a further resource into the measurement report, wherein the further resource is associated with a first RAT having a first RAT resource reporting value greater than 0.

17. The method of claim 16, wherein the further resource and any other resources are included one by one from the different lists of valid neighbor resources associated with the plurality of RATs in accordance to the RAT sequence.

18. The method of claim 1, wherein the MS supports a combination of RATs including one or more of UTRAN-TDD, UTRAN-FDD, E-UTRAN, and CDMA2000.

19. The method of claim 1, further comprising at least one of:
   receiving the plurality of lists of neighbor resources at the MS; or
   determining a valid neighbor resource associated with a first RAT at the MS and adding the determined neighbor resource to the respective list of valid neighbor resources.

20. The method of claim 1, wherein the network resources are at least one of network cells or frequencies.

21. A multi-RAT mobile station (MS) configured to support a plurality of radio access technologies (RATs), the mobile station comprising:
   a memory; and
   a processor programmed to prepare a measurement report on network resources in the vicinity of the MS by at least:
      receiving a plurality of RAT resource reporting values, each RAT resource reporting value indicating a number of resources of a corresponding RAT to be included into the measurement report;
      determining a plurality of lists of valid neighbor resources associated with the plurality of RATs; and
      including resources from the plurality of lists of valid neighbor resources into the measurement report according to a RAT sequence specifying an ordering of the RATs in the plurality of RATs, wherein a second resource of a given RAT is not included into the measurement report until after a respective first resource for each one of the plurality of RATs for which the RAT resource reporting value is greater than zero has already been included into the measurement report according to the RAT sequence.

22. A tangible storage device comprising a software program comprising machine-readable instructions which, when executed by a computing device, cause the computing device to at least:
   receive a plurality of radio access technology (RAT) resource reporting values, each RAT resource reporting value indicating a number of resources of a corresponding RAT to be included into the measurement report;
   determine a plurality of lists of valid neighbor resources associated with the plurality of RATs; and
   include resources from the plurality of lists of valid neighbor resources into the measurement report according to a RAT sequence specifying an ordering of the RATs in the plurality of RATs, wherein a second resource of a given RAT is not included into the measurement report until after a respective first resource for each one of the plurality of RATs for which the RAT resource reporting value is greater than zero has already been included into the measurement report according to the RAT sequence.

* * * * *